United States Patent
Hollingshead et al.

(10) Patent No.: US 7,212,883 B2
(45) Date of Patent: May 1, 2007

(54) MACHINE READABLE MEDIUM AND METHOD FOR DETERMINING FEATURE-RELATING TOLERANCE CONSUMED

(75) Inventors: Paul C. Hollingshead, Florissant, MO (US); Craig A. Beike, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 380 days.

(21) Appl. No.: 10/800,383

(22) Filed: Mar. 12, 2004

(65) Prior Publication Data
US 2005/0203661 A1  Sep. 15, 2005

(51) Int. Cl.
*G06F 19/00* (2006.01)
*G01B 15/00* (2006.01)

(52) U.S. Cl. .................. 700/182; 700/58; 700/194; 702/82; 702/155; 703/7

(58) Field of Classification Search ................ 700/56, 700/57, 58, 97, 182, 194; 702/2, 155; 703/1, 703/6, 7
See application file for complete search history.

(56) References Cited

U.S. PATENT DOCUMENTS

| | | | | |
|---|---|---|---|---|
| 4,288,852 A | * | 9/1981 | Holland ................ 382/152 |
| 4,754,417 A | * | 6/1988 | Beeson et al. ............. 703/7 |
| 4,918,627 A | * | 4/1990 | Garcia et al. .............. 702/82 |
| 5,586,052 A | * | 12/1996 | Iannuzzi et al. .............. 703/1 |
| 6,978,220 B2 | * | 12/2005 | Wilson ................... 702/155 |
| 6,993,431 B2 | * | 1/2006 | Hollingshead et al. ...... 702/155 |

OTHER PUBLICATIONS

Dimensioning and Tolerancing standard of the American Society of Mechanical Engineers (ASME) Y14.5M-1994, Department of Defense (DOD) Published by American Society of Mechanical Engineers (1994), pp. 81-155.
Wilson, Bruce A., "Design Dimensioning and Tolerancing", Publisher: Goodheart-Wilcox Co; 3rd edition (Jan. 2001), pp. 187-189 and 248-251.
Foster, Lowell W., "Geo-Metrics II—The Application of Geometric Tolerancing Techniques", revised 1986 edition, pp. 281-289.

* cited by examiner

*Primary Examiner*—Albert W. Paladini
*Assistant Examiner*—Douglas S. Lee
(74) *Attorney, Agent, or Firm*—Ingrassia Fisher & Lorenz, P.C.

(57) ABSTRACT

A machine readable medium and a method are disclosed that determine whether a pattern of manufactured or simulated features violates a feature relating tolerance and determines acceptability of the pattern. Allowable tolerance may include feature relating tolerances and material conditions. Manufactured centers are drawn relative to a one true position. A circle drawn through or outside the manufactured centers is used to determine if there is feature relating tolerance violation. Material condition may also be used.

47 Claims, 9 Drawing Sheets

MACHINE READABLE MEDIUM AND METHOD FOR DETERMINING FEATURE-RELATING TOLERANCE CONSUMED

GOVERNMENT RIGHTS

This invention was made with Government support under FAR 52.227-12 awarded by Comanche EMD contract. The Government has certain rights in this invention.

BACKGROUND OF THE INVENTION

The present invention generally relates to the production of articles of manufacture in a computer simulation or in the real world, and more particularly, to a method for accurately evaluating pattern compliance for a simulated or manufactured article.

American, Canadian, German, and International Organization for Standardization (ISO) standards define methods for specifying multiple levels of pattern and feature related tolerances often referred to as composite positional tolerances. Composite positional tolerances include a pattern locating tolerance and a feature relating tolerance. A pattern locating tolerance is a tolerance that relates a collection of manufactured features on an object relative individually to the specified datums of the designed pattern. A feature relating tolerance can include a tolerance relating to the size of a feature, the positions of a set of features relative to each other, and the rotation of a pattern of features relative to a specified origin.

Another specification may include maximum material condition (MMC) and least material condition (LMC). MMC may be defined as the condition in which a feature of size contains the maximum amount of material within the stated limits of size, for example, minimum hole diameter or maximum shaft diameter. LMC may be defined as the condition in which a feature of size contains the least amount of material within the stated limits of size, for example, maximum hole diameter, or minimum shaft diameter. An allowable tolerance may be specified as the combination of the pattern-locating and feature related tolerances and a material condition.

Presently, the manufacturing industry does not have an efficient or effective way of determining whether or not the feature relating requirements are achieved. Inspection of manufactured articles and analyzing the resulting data are not currently evaluated in an automated and correct manner to determine whether or not combined manufactured features such as hole size and location are acceptable to the applied feature relating tolerances. For example, evaluating manufactured hole size, form, orientation, and location are all completed separately, and confidence in the accuracy of each evaluation is low.

Figure 1:
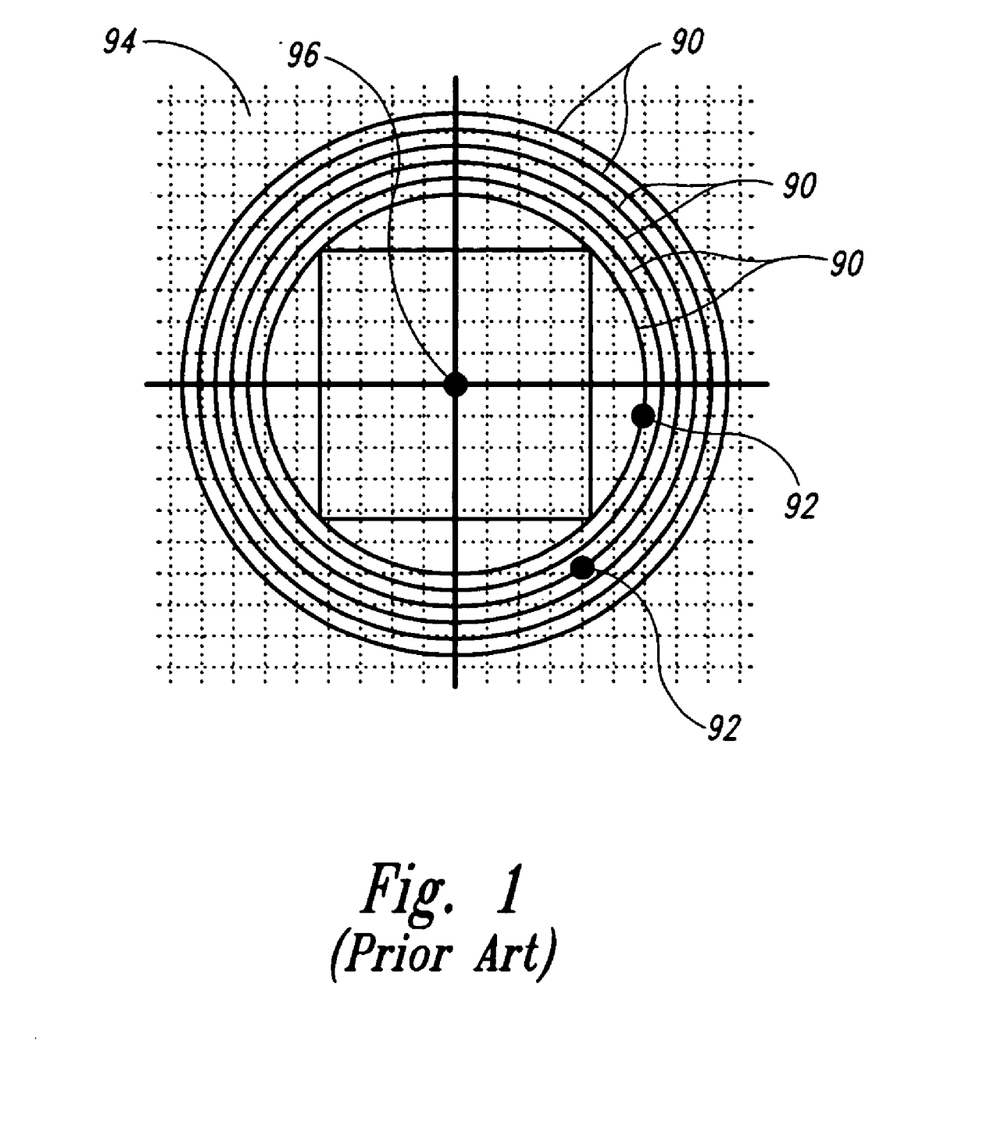
FIG. 1 is a diagram illustrating a prior art paper gaging technique for documenting inspection data.

Referring to FIG. 1, one method for documenting inspection data consists of paper gaging, where information is recorded on paper. Measurements are taken, and hole positions 92 are plotted on a grid 94 at an enlarged scale using a true position 96 as the origin. Concentric circles 90 representing tolerance zone diameters are then overlain to determine compliance with the pattern locating tolerance. This method does not consider variation in feature size easily, and does nothing to examine compliance with the feature relating tolerance.

As can be seen, there is a need for accurately determining inspection data. Also, there is a need for determining inspection data in a timely manner, with perhaps, using only a single iteration. Moreover, there is a need for quickly analyzing inspection data in a step of the manufacturing process so that the results of the analysis can be used in subsequent processes.

Variation effects within a pattern of features may also be determined when performing a variation analysis of a design prior to manufacturing that design. The variation analysis software performs hundreds or thousands of simulated build cycles, and in each cycle, varies all of the parameters randomly. Assembly variation analysis that utilizes feature patterns, such as holes, for assembly is currently reliant on approximations and iterations for the assembly of parts. Such a process may introduce error, is inefficient, and requires advanced software skills for completion.

In addition to the need for assessing produced parts, there is a need to accurately determine the variation effects on patterns of features during variation analysis.

SUMMARY OF THE INVENTION

The present invention provides a machine-readable medium for programming a computer to determine feature relating tolerance consumed for a plurality of manufactured features on an object, the medium including processor executable instructions comprising determining a true position for each of the plurality of manufactured features, determining a location for each of the plurality of manufactured features, organizing each of the true positions into a single association, organizing the location of each of the plurality of manufactured features relative to the single association, determining a circle that intersects or contains each location, determining the diameter of the circle, and comparing the diameter of the circle with the size of the feature relating tolerance to determine acceptability of the pattern.

In one aspect of the present invention, a machine-readable medium programs a computer to determine feature relating tolerance consumed for a plurality of manufactured holes on an object, the medium including processor executable instructions comprising, determining a true position for each of the plurality of manufactured holes, determining a center for each of the plurality of manufactured holes, superimposing each of the true positions to form one true position, determining the centers of each of the plurality of manufactured holes relative to the one true position, determining a circle that intersects or contains each of the centers of the circles, determining the diameter of the circle, and determining feature relating tolerance consumed from said diameter.

In another aspect of the present invention, a machine-readable medium programs a computer to determine feature relating tolerance consumed for a plurality of manufactured features on an object where at least one additional feature is added to a pattern of features, the medium including processor executable instructions comprising, determining a true position for each of the plurality of manufactured features, determining a location for each of the plurality of manufactured features, organizing each of the true positions into a single association, organizing the location of each of the plurality of manufactured features relative to the single association, determining a first circle that intersects or contains each location, determining the location of the additional feature, determining if the location of the additional feature is contained within the first circle, determining a second circle that intersects or contains the plurality of manufactured features and the additional feature, if the additional feature is not contained with the first circle, determining the diameter of the second circle, and comparing the diameter of the second circle with the feature relating tolerance to determine acceptability of the pattern.

Another aspect of the present invention provides machine-readable medium for programming a computer to determine feature relating tolerance consumed for a plurality of manufactured features on an object, the medium including processor executable instructions comprising, determining a true position for each of the plurality of manufactured features, determining a center for each of the plurality of manufactured features, organizing each of the true positions into a one true position, organizing the center of each of the plurality of manufactured features relative to the one true position, determining a departure circle about each of the centers, and determining a circle that is tangent to or contains each of the departure circles.

Another aspect of the present invention provides a machine-readable medium for programming a computer to determine whether a pattern of features violates a pattern locating tolerance for a plurality of manufactured features on an object, the medium including processor executable instructions comprising, determining a true position for each of the plurality of manufactured features, determining a center for each of the plurality of manufactured features, organizing each of the true positions into a one true position, organizing the center of each of the plurality of manufactured features relative to the one true position, determining a departure circle about each of the centers, and determining where the departure circles lie relative to a pattern locating tolerance circle.

Another aspect of the present invention provides a system in a manufacturing site, the system comprising a computer and a coordinate measuring machine adapted to determine whether a pattern of manufactured features violate a pattern locating tolerance, and adapted to determine feature relating tolerance consumed for the pattern of features, the system adapted to perform the steps of determining a true position for each of the plurality of manufactured features, determining a center for each of the plurality of manufactured features, organizing each of the true positions into a one true position, organizing the center of each of the plurality of manufactured features relative to the one true position, determining a departure circle about each of the centers, determining if any of the departure circles lies outside a pattern locating tolerance circle to determine if the pattern locating tolerance is violated, determining a circle that is tangent to or contains each of the departure circles, and comparing a diameter of said circle to said feature relating tolerance to determine acceptability of the pattern.

Another aspect of the present invention provides a method for determining feature relating tolerance consumed for a plurality of manufactured features on an object comprising determining a true position for each of the plurality of manufactured features, determining a location for each of the plurality of manufactured features, organizing each of the true positions into a single association, organizing the location of each of the plurality of manufactured features relative to the single association, determining a circle that intersects or contains each location, determining the diameter of the circle, and comparing the diameter of the circle with the feature relating tolerance to determine the acceptability of the pattern.

In a further aspect of the present invention provides a method to determine used tolerances for a plurality of manufactured features on an object comprising determining a true position for each of the plurality of manufactured features, determining a center for each of the plurality of manufactured features, organizing each of the true positions into a one true position, organizing the center of each of the plurality of manufactured features relative to the one true position, determining a departure circle about each of the centers, determining a circle that contains each of the departure circles, and comparing the circle to the magnitude of the feature relating tolerances.

These and other features, aspects and advantages of the present invention will become better understood with reference to the following drawings, description and claims.

What is needed is a method to evaluate manufactured objects for pattern compliance and compliance with allowable tolerance in a timely and accurate manner. This method may be hand implemented as well as being implemented as a computer program retained on a machine-readable medium.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims. References to manufactured features may equally refer to features generated in a computer simulation or features produced in fabrication processes.

The present invention provides a machine readable medium, method and system for determining the size and location of manufactured features on an object, determining the translation of a pattern of features, and determining tolerance consumed. Such method may be, but is not limited to, hand-implemented or implemented by a computer program. By determining tolerance consumed for features such as holes during or shortly after a manufacturing process, mating parts can be correctly designed and efficient assembly processes chosen. The present invention may be implemented at or in close proximity to a manufacturing site where the manufactured article is produced.

The present invention differs from the prior art in that the present invention provides a method for accurately determining inspection information. Also, the present invention provides a method for determining inspection information in a timely manner using only a single iteration. Moreover, the present invention provides a method for quickly analyzing inspection data in a step of the manufacturing process so that the results of the analysis can be used in subsequent processes.

Figure 2:
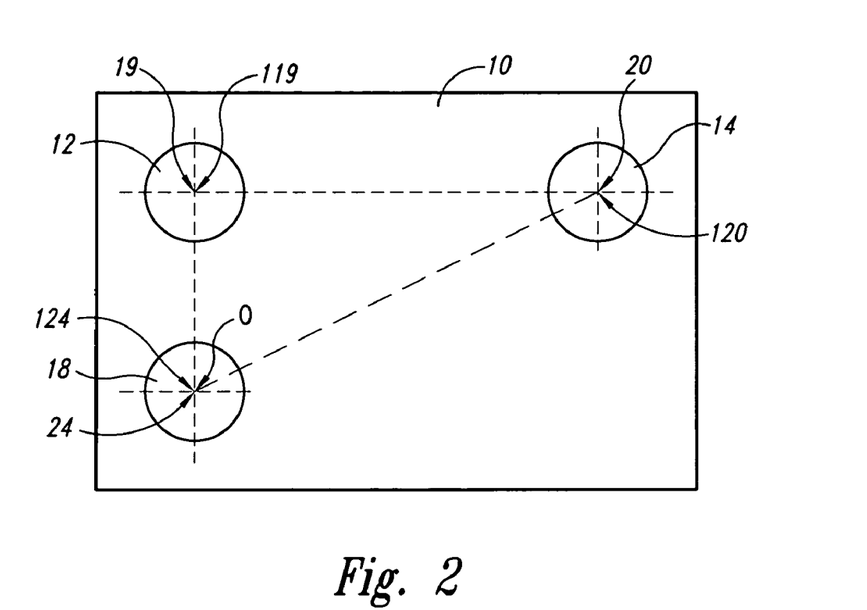
FIG. 2 is a diagram illustrating a designed rectangular plate having three holes, according to an embodiment of the present invention.

In an embodiment, FIG. 2 is a diagram illustrating the designed features for an object such as a part. The designed part may be a rectangular plate 10 having features including three spaced-apart circular holes 12, 14, 18. The manufactured holes may have a cross-sectional shape, including, but not limited to, circular, oval and quadrilateral. Each of the designed circular holes 12, 14, 18 has a center, referred to as the true center 19, 20, 24, respectively, and a designed size, referred to as a true size. The designed size may be gauged using the diameter of the circle as well as the area of the circle. Each hole 12, 14, 18 may have a designed position on the rectangular plate referred to as a true position. The true centers 19, 20, 24 may be used as the true position 119, 120, 124 for each hole 12, 14, 18, respectively. One of the true centers, for example, the true center 24 for the bottom left circle 18 may be used as the origin of a Cartesian coordinate system. A computer aided drafting (CAD) system may be used to render the diagram. The information of the circular holes 12, 14, and 18 may be represented as digital data and stored on a machine-readable medium including a hard drive and an optical disk, as well as being processed on a computer.

Figure 3:
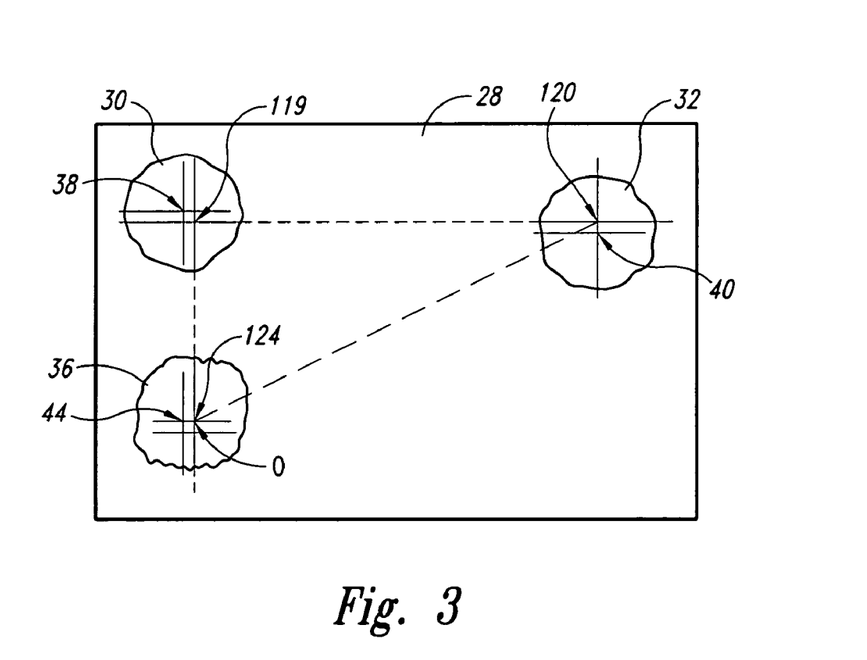
FIG. 3 is a diagram illustrating a manufactured rectangular plate for the designed rectangular plate in FIG. 2, according to an embodiment of the present invention.

FIG. 3 is a diagram illustrating a manufactured rectangular plate 28, created from the design illustrated in FIG. 2. The manufactured holes 30, 32, and 36 correspond to designed holes 12, 14 and 18. Manufactured rectangular plate 28 may also represent a simulated manufactured plate, and manufactured holes 30, 32, and 36 may represent simulated manufactured holes. The simulated holes may be generated to provide a variation analysis model of a rectangular plate. Each manufactured hole 30, 32, 36 has deviated from the true size as well as the true position. A true size deviation may comprise a hole larger than designed, or a hole smaller than designed. Each hole may have a positional error relative to its true position. The positional error may be determined by the distance between center 38, 40, 44 of each manufactured hole 30, 34, 36 and their true positions 119, 120, 124, respectively. The deviations may extend along the depth of each hole. Data regarding the dimensions and position of the manufactured rectangular plate 28 may be acquired by many methods known in the art, including, but not limited to, examining the rectangular plate 28 with a coordinate measuring machine.

Figure 4:
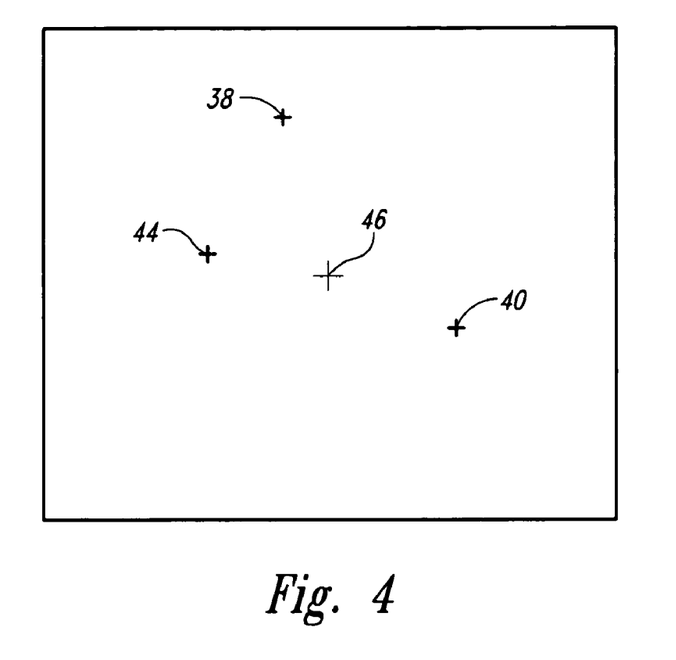
FIG. 4 is a diagram illustrating the centers of manufactured holes relative to a one true position, according to an embodiment of the present invention.

FIG. 4 is a diagram illustrating the centers 38, 40, 44 of each manufactured hole relative to a one true position 46. The one true position 46 represents the true positions of each manufactured holes 30, 32, 36 as a single point. The one true position 46 may be a superimposition of true positions 119, 120, 124. The centers 38, 40, 44 of each manufactured hole are drawn relative to the one true position 46 as they would be drawn relative to their true positions 119, 120, 124 (FIG. 3), respectively. The one true position 46 may be represented as the arbitrarily-positioned origin of a coordinate system, including an x, y coordinate system and in this coordinate system, the centers 38, 40, 44 of each manufactured hole are drawn with respect to the one true position 46.

Figure 5:
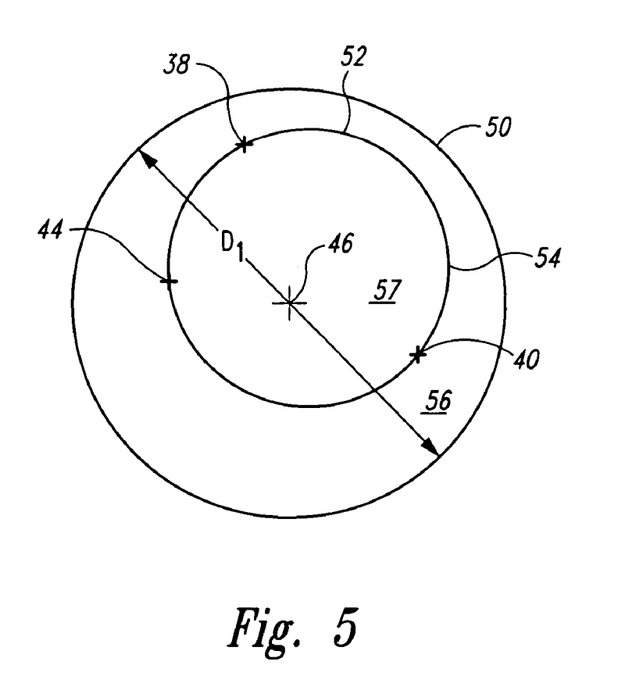
FIG. 5 is a diagram illustrating a pattern locating tolerance zone about the one true position illustrated in FIG. 4, according to an embodiment of the present invention.

FIG. 5 is a diagram illustrating a circle 50 that represents the pattern locating tolerance zone (PLTZ) about the one true position 46. A PLTZ is a tolerance zone that may be specified in the design data. The PLTZ specifies the positional tolerance for features in a group. The diameter $D_1$ of the circle 50 represents the PLTZ. A feature relating circle 52 may be drawn that intersects or includes each of the centers 38, 40, 44. The feature relating circle 52 may represent the magnitude of the feature relating tolerances. The feature relating circle 52 provides a range of how the existing holes 30, 32, 36 (FIG. 3) deviate from the one true position 46, and thus, feature relating circle 52 provides an accurate indicator of the deviations of the manufactured holes 30, 32, 36 from the designed pattern. The diameter of the feature relating circle 52 indicates the maximum deviation of the manufactured holes 30, 32, 36 (FIG. 3) and the amount of tolerances consumed. The region 56 outside of feature relating circle 52 would indicate a positional error relative to the pattern of features that is greater than any of the positional errors of manufactured holes 30, 32, 36. The region 57 inside of feature relating circle 52 would indicate a positional error relative to the pattern of features that is smaller than the combined positional errors of manufactured holes 30, 32, 36.

Figure 6A:
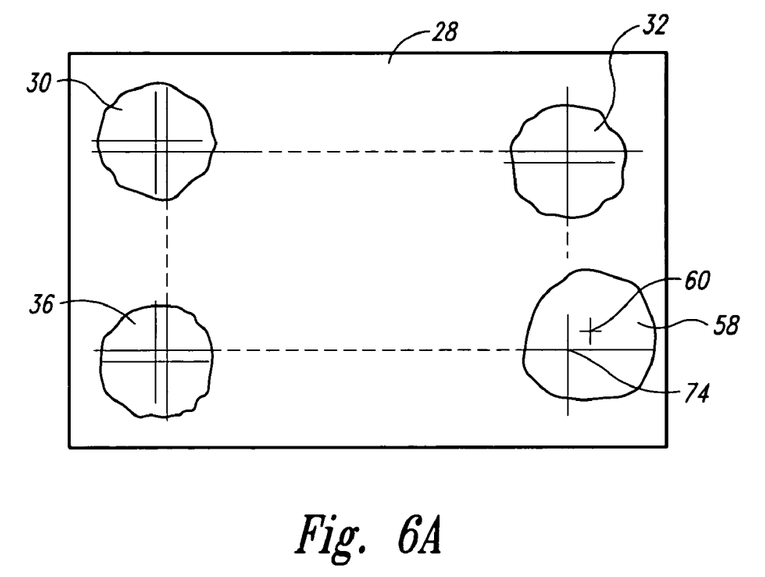
FIG. 6A is a diagram illustrating an embodiment of the rectangular plate in FIG. 3, with an additional manufactured hole, according to an embodiment of the present invention.
Figure 7:
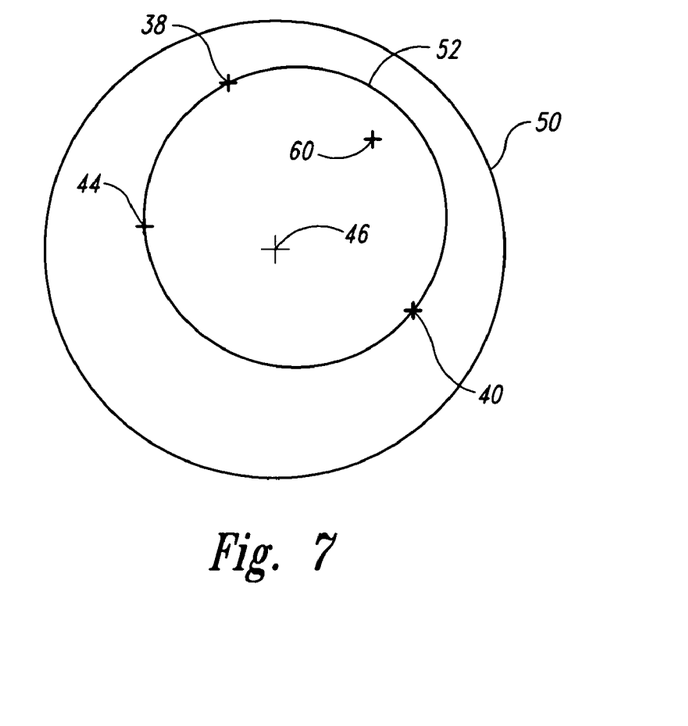
FIG. 7 is the center of the additional manufactured hole in FIG. 6A, shown relative to the one true position in FIG. 5, according to an embodiment of the present invention.

FIG. 6A is a diagram illustrating an embodiment of a rectangular plate 28 in FIG. 3, with an additional manufactured hole 58. In an embodiment, FIG. 7 is a diagram illustrating the center 60 of a fourth manufactured hole 58 (FIG. 6A) shown relative to the one true position 46 of FIG. 5. The one true position 46 in FIG. 7 includes the true position 74 (FIG. 6A) of manufactured hole 58. In this embodiment, the center 60 of manufactured hole 58 lies within the feature relating circle 52, and thus manufactured hole 58 does not have a relative positional error greater than the deviation of manufactured holes 30, 32, 36. Feature relating circle 52 remains a valid indicator of the range of the relative positional errors of all manufactured holes, 30, 32, 36, 58 on the rectangular plate 28.

Figure 6B:
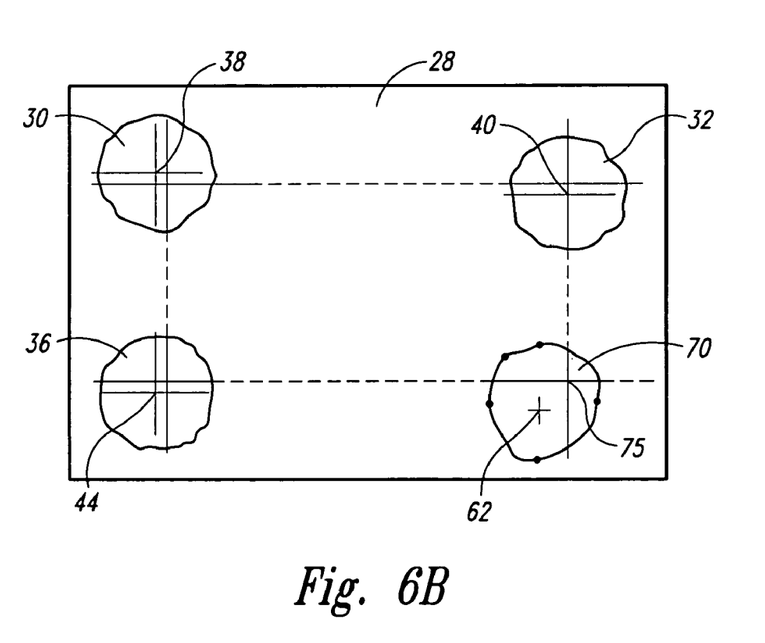
FIG. 6B is a diagram illustrating an embodiment of the rectangular plate in FIG. 3, with an additional manufactured hole, according to an embodiment of the present invention.
Figure 8:
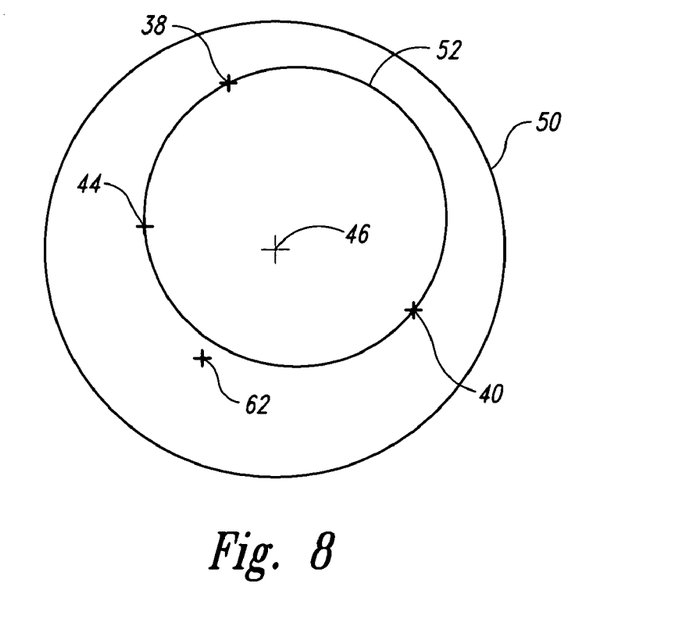
FIG. 8 is the center of the additional manufactured hole in FIG. 6B, shown relative to the one true position in FIG. 5, according to an embodiment of the present invention.

FIG. 6B is a diagram illustrating an embodiment of the rectangular plate 28 in FIG. 3, with an additional manufactured hole 70. In another embodiment, FIG. 8 is a diagram illustrating a manufactured center 62 of the fourth manufactured hole 70 from FIG. 6B shown relative to the one true position 46. The one true position 46 includes the true position 75 of manufactured hole 70. In this embodiment, the center 62 of manufactured hole 70 lies outside of feature relating circle 52, and thus manufactured hole 70 has a positional error that is greater than the deviation of manufactured holes 30, 32, 36. Feature relating circle 52 is no longer a valid indicator of the range of the relative positional errors of all manufactured holes, 30, 32, 36, 70 on the rectangular plate 28. Thus, a new feature relating circle must be drawn that includes all of the centers.

Figure 9:
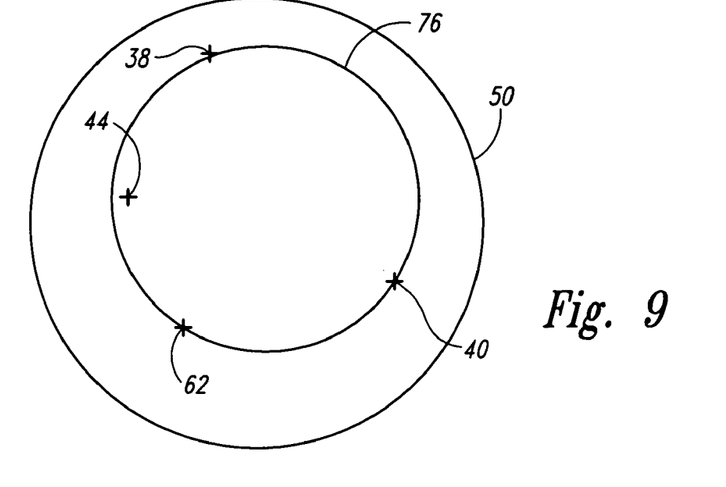
FIG. 9 is a diagram illustrating a pattern related circle that includes all the centers of the manufactured holes of FIG. 6B, according to an embodiment of the present invention.

FIG. 9 is a diagram illustrating a feature relating circle 76 that includes all the centers 38, 40, 44 and 62 of the manufactured holes 30, 32, 36 and 70 of FIG. 6B, respectively. The feature relating circle 76 may be derived by including manufactured center 72, of manufactured hole 70 which was not included in feature relating circle 52 of FIG. 8. Feature relating circle 76 includes manufactured centers 38, 40 and 44 as well as manufactured center 62. Feature relating circle 76 may be used as a gauge to determine the relative positional errors of manufactured holes 30, 32, 36, 70 for the rectangular plate 28 in FIG. 6B.

Figure 10:
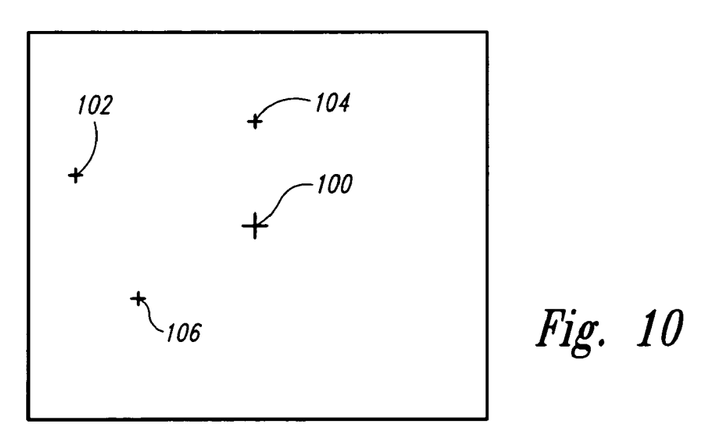
FIG. 10 is a diagram illustrating hole centers relative to a one true position, according to an embodiment of the present invention.
Figure 11:
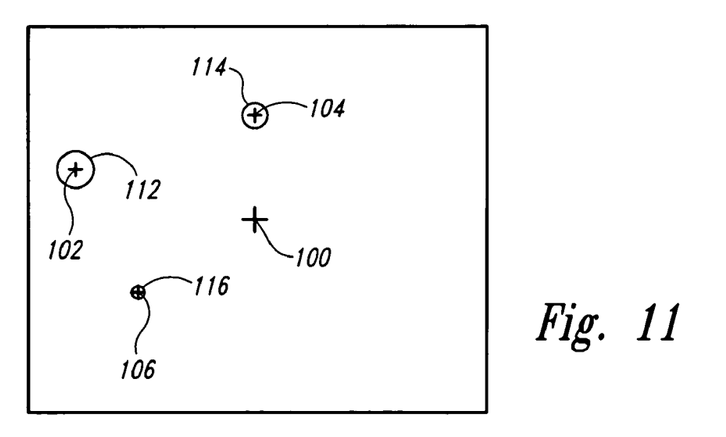
FIG. 11 is a diagram illustrating the departure circles around the hole centers illustrated in FIG. 10, according to an embodiment of the present invention.

In an embodiment, the used or consumed tolerance for any object having a pattern of features may be determined. FIG. 10 is a diagram illustrating manufactured centers 102, 104 and 106 relative to a one true position 100 for an object, such as a rectangular plate having internal features such as holes. FIG. 11 is a diagram illustrating the size departure 112, 114 and 116 as departure circles for each of hole centers 102, 104 and 106, respectively. The departure for an internal feature such as a hole may be the difference in diameter from the minimum hole diameter allowable for a feature in a pattern. This difference could be positive or negative. A positive difference in diameter is considered to be a positive diameter of the departure circle. A negative difference in diameter means that the feature relating circle should pass to the outside of that departure circle. The center for the departure circle is the still the manufactured center of the feature relative to a one true position. The departure for an external feature such as a pin may be the difference in diameter from the maximum pin diameter. A positive difference in diameter of an external feature means that the feature relating circle should pass to the outside of that departure circle.

Figure 12:
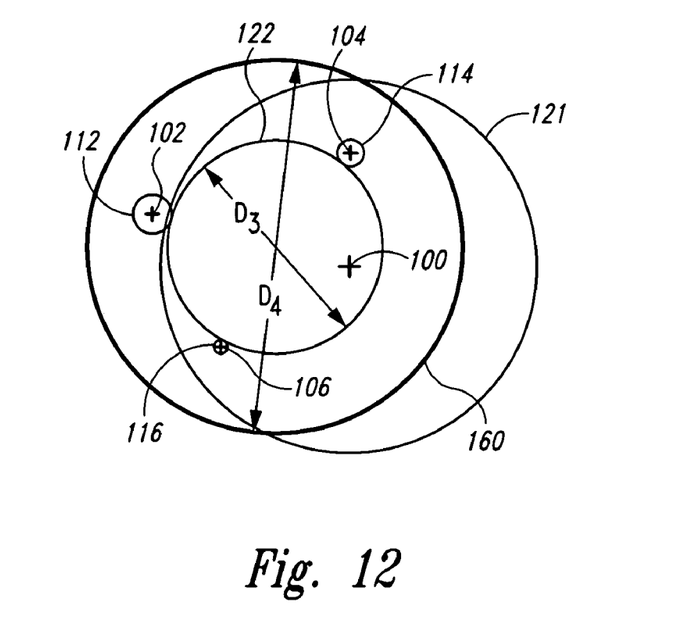
FIG. 12 is a diagram illustrating a pattern locating tolerance used for the pattern in FIG. 11.

FIG. 12 is a diagram illustrating the PLTZ 121 and used tolerance for the object in FIG. 11. A PLTZ 121 may be represented by circle and is centered about the one true position 100. The PLTZ 121 is not violated if a portion of each of the departure circles 112, 114, and 116 lies within the PLTZ circle 121. The departure circle 112, 114 and 116 for each hole center 102, 104 and 106 may be drawn relative to the one true position 100.

Still referring to FIG. 12, the used tolerance of the holes corresponding to hole centers 102, 104 and 106 may be derived by a used feature relating circle 122 that is tangent to the near side of each departure circle 112, 114 and 116. Typically, when circle 122 is drawn to the near side of each departure circle 112, 114 and 116, each departure circle 112, 114 and 116 lies outside of circle 122. The diameter $D_3$ of consumed tolerance circle 122 may be compared with the diameter $D_4$ of an allowable tolerance circle 160 that represents allowable feature relating tolerance. If diameter $D_3$ is greater than diameter $D_4$ then the pattern of internal features having centers 102, 104 and 106 and size departures exceeds the allowable tolerances.

Figure 13:
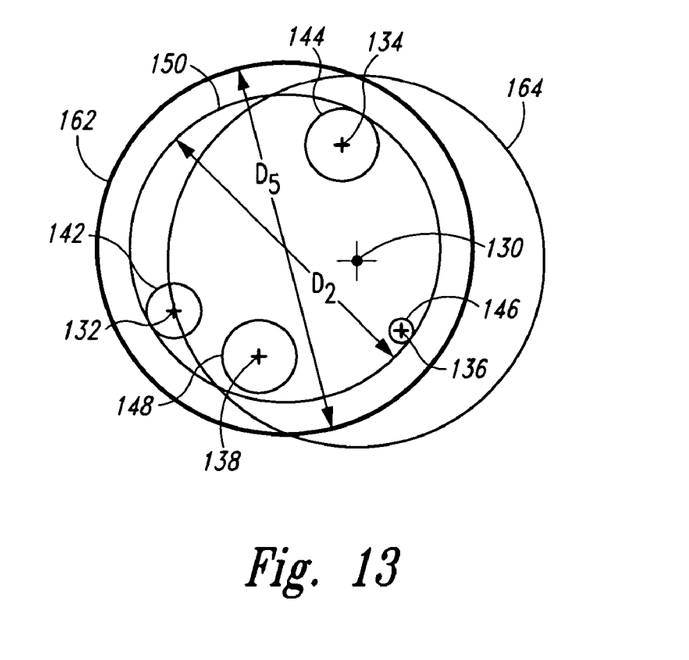
FIG. 13 is a diagram illustrating centers of four external features relative to a one true position.

FIG. 13 is a diagram illustrating centers 132, 134, 136, 138 of four external features relative to a one true position 130. External features may include, but are not limited to, pins. Departure circles 142, 144, 146 148 are drawn about the centers 132, 134, 136, 138 of each external feature, respectively. Similar to the method described in FIG. 12, a PLTZ may be represented by circle 164 and may be centered about the one true position 130. The PLTZ is not violated if each of the departure circles 142, 144, 146 148 lies entirely within the PLTZ circle 164.

Still referring to FIG. 13, a used tolerance circle 150 may be drawn that is the smallest circle that contains all of the departure circles 142, 144, 146 148. Typically, the used tolerance circle 150 may be tangent to the outside of some of the departure circles, for example, departure circles 142, 144, and 146. The diameter $D_2$ of the used tolerance circle 150 may be compared to with the diameter $D_5$ of an allowable tolerance circle 162. If the diameter $D_2$ of the used tolerance circle 150 is smaller than the diameter $D_5$ of the allowable tolerance circle 162, then the pattern of external features does not exceed the allowable tolerance. The diameter $D_2$ of used tolerance circle 150 may be compared with the diameter $D_5$ of an allowable tolerance circle 162 to determine the remaining allowable tolerance.

Figure 14:
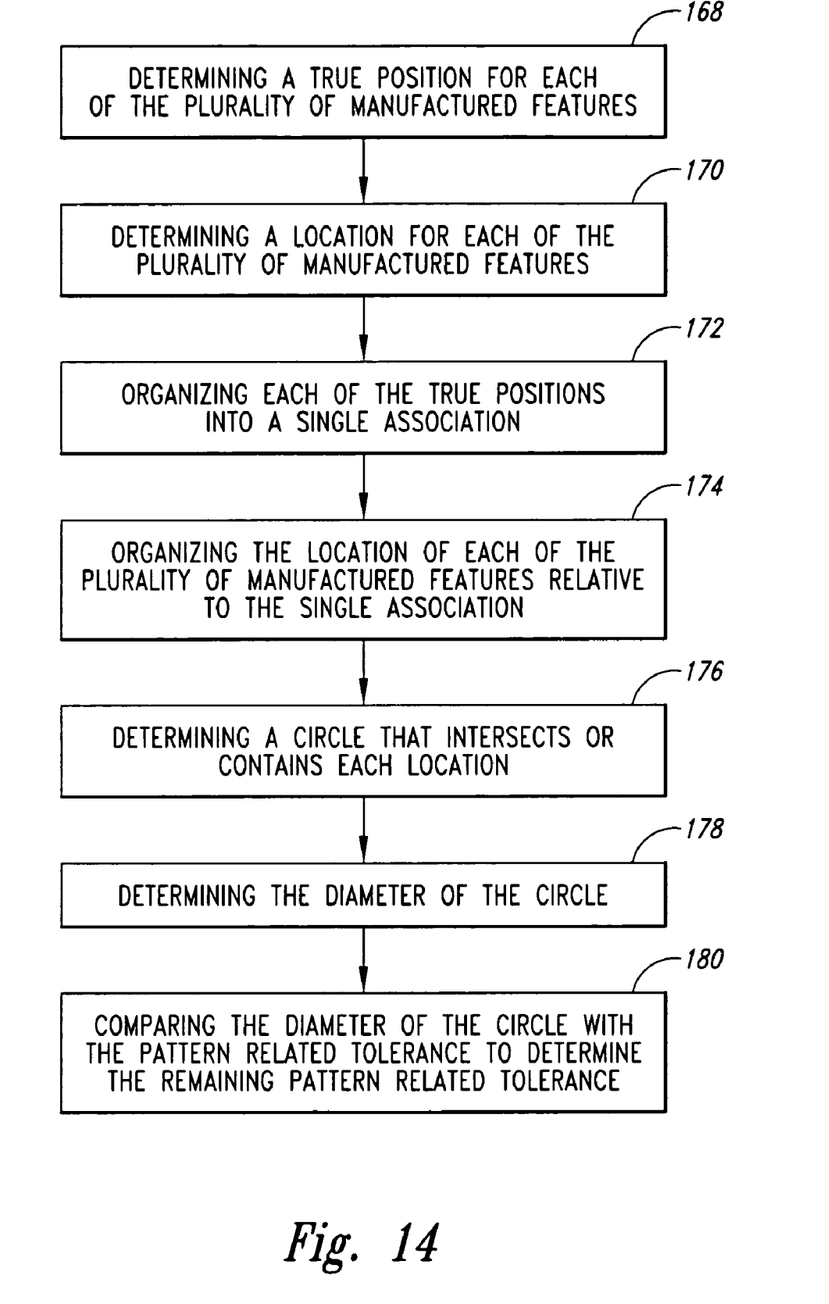
FIG. 14 is a flowchart illustrating a method for determining feature relating tolerance consumed for a plurality of manufactured features on an object.

FIG. 14 is a flowchart illustrating an embodiment of the method illustrated in FIGS. 2–5, for determining feature relating tolerance consumed for a plurality of manufactured features on an object. One step for determining remaining pattern related tolerance for a plurality of manufactured features on an object may comprise determining 168 a true position for each of the plurality of manufactured features. Another step for determining remaining pattern related tolerance for a plurality of manufactured features on an object may comprise determining 170 a location for each of the plurality of manufactured features. Another step may comprise organizing 172 each of the true positions into a single association. Another step may comprise organizing 174 the location of each of the plurality of manufactured features relative to the single association. Another step may comprise determining 176 a circle that intersects or contains each location. Another step may comprise determining 178 the diameter of the circle. Another step may comprise comparing 180 the diameter of the circle with the pattern related tolerance to determine the acceptability of the pattern.

Figure 15:
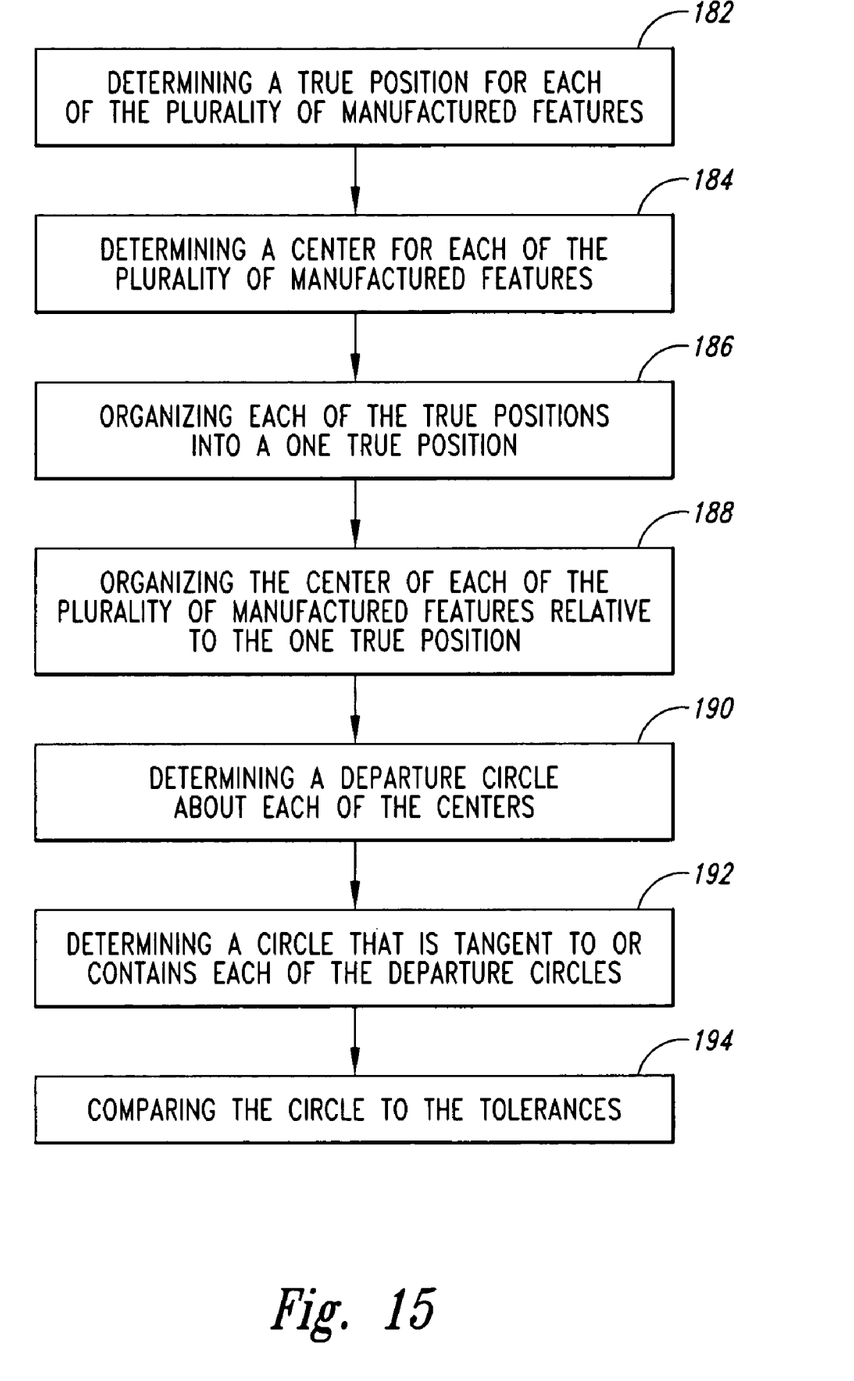
FIG. 15 is a flowchart illustrating a method for determining consumed feature-relating tolerance for a plurality of manufactured features on an object.

FIG. 15 is a flowchart illustrating an embodiment of the method illustrated in FIGS. 10–13, for determining consumed tolerances for a plurality of manufactured features on an object. One step for determining used tolerances for a plurality of manufactured features on an object may comprise determining 182 a true position for each of the plurality of manufactured features. Another step for determining used tolerances for a plurality of manufactured features on an object may comprise determining 184 a center for each of the plurality of manufactured features. Another step may comprise organizing 186 each of the true positions into a one true position. Another step may comprise organizing 188 the center of each of the plurality of manufactured features relative to the one true position. Another step may comprise determining 190 a departure circle about each of the centers. Another step may comprise determining 192 a circle that is tangent to or contains each of the departure circles. Another step may comprise comparing 194 the circle to the tolerances.

It should be understood, of course, that the foregoing relates to preferred embodiments of the invention and that modifications may be made without departing from the spirit and scope of the invention as set forth in the following claims.

We claim:

1. A machine-readable medium for programming a computer to determine feature relating tolerance consumed for a plurality of manufactured features on an object, said medium comprising processor executable instructions for
 determining a true position for each of said plurality of manufactured features;
 determining a location for each of said plurality of manufactured features;
 organizing each of said true positions into a single association;
 organizing the location of each of said plurality of manufactured features relative to said single association;
 determining a circle that intersects or contains each location;
 determining the diameter of said circle; and
 comparing the diameter of said circle with said feature relating tolerance to determine acceptability of the pattern.

2. The machine-readable medium of claim 1 where said manufactured feature comprises a hole.

3. The machine-readable medium of claim 1 where said processor executable instruction of determining a true position for each of said plurality of manufactured features comprises
 determining a designed center for each of a plurality of manufactured holes.

4. The machine-readable medium of claim 1 where said processor executable instruction of organizing each of said true positions into a single association comprises
 superimposing said true positions to determine a one true position.

5. The machine-readable medium of claim 1 where said processor executable instruction of organizing the location of each of said plurality of manufactured features relative to said single association comprises
 organizing the location of manufactured holes relative to a one true position.

6. The machine-readable medium of claim 5 where said one true position is an arbitrarily positioned origin on an x, y coordinate system.

7. The machine-readable medium of claim 1 where said plurality of manufactured features are simulated manufactured features.

8. A machine-readable medium for programming a computer to determine feature relating tolerance consumed for a plurality of manufactured holes on an object, said medium comprising processor executable instructions for
 determining a true position for each of said plurality of manufactured holes;
 determining a center for each of said plurality of manufactured holes;
 superimposing each of said true positions to form a one true position;
 determining the centers of each of said plurality of manufactured holes relative to said one true position;
 determining a circle that intersects or contains each of said centers;
 determining the diameter of said circle;
 determining feature relating tolerance consumed from said diameter.

9. The machine-readable medium of claim 8 where said processor executable instruction of determining a center for each of said plurality of manufactured holes comprises
 acquiring dimensions of said manufactured holes with a coordinate measuring machine; and
 determining the center of said manufactured holes from said dimensions.

10. The machine-readable medium of claim 8 where said plurality of manufactured holes are simulated manufactured holes.

11. The machine-readable medium of claim 8 where said processor executable instruction of determining feature relating tolerance consumed from said diameter comprises
 determining a feature relating tolerance circle; and
 comparing said diameter with said feature relating tolerance circle.

12. A machine-readable medium for programming a computer to determine feature relating tolerance consumed for a plurality of manufactured features on an object where at least one additional feature is added to a pattern of features, said medium comprising processor executable instructions for
 determining a true position for each of said plurality of manufactured features;
 determining a location for each of said plurality of manufactured features;
 organizing each of said true positions into a single association;
 organizing the location of each of said plurality of manufactured features relative to said single association;
 determining a first circle that intersects or contains each location;
 determining the location of said additional feature;
 determining if the location of said additional feature is contained within said first circle;
 determining a second circle that intersects or contains said plurality of manufactured features and said additional feature, if said additional feature is not contained with said first circle;
 determining the diameter of said second circle; and
 comparing the diameter of said second circle with said feature relating tolerance to determine acceptability of the pattern.

13. The machine-readable medium of claim 12 where said manufactured feature comprises a hole.

14. The machine-readable medium of claim 12 where said processor executable instruction of determining a second circle that intersects or contains said plurality of manufactured features and said additional feature, if said additional feature is not contained with said first circle comprises
 identifying said additional feature;
 determining a center of said additional feature;
 determining a second circle that intersects or contains the centers of said manufactured features.

15. The machine-readable medium of claim 12 where said plurality of manufactured features are simulated manufactured features.

16. A machine-readable medium for programming a computer to determine used feature relating tolerance consumed for a plurality of manufactured features on an object, said medium comprising processor executable instructions for
 determining a true position for each of said plurality of manufactured features;
 determining a center for each of said plurality of manufactured features;
 organizing each of said true positions into a one true position;
 organizing the center of each of said plurality of manufactured features relative to said one true position;
 determining a departure circle about each of said centers; and
 determining a circle that is tangent to or contains each of said departure circles.

17. The machine-readable medium of claim 16 where said step of determining a true position for each of said plurality of manufactured features comprises determining the designed center for each of said manufactured features.

18. The machine-readable medium of claim 16 where said step of determining a departure circle about each of said centers comprises determining a difference in diameter from the minimum hole diameter allowable for a feature in a pattern.

19. The machine-readable medium of claim 16 where said step of determining a circle that is tangent to each of said departure circles comprises
   providing a plurality of internal manufactured features; and
   determining a circle that contains or is tangent to a near side of each departure circles.

20. The machine-readable medium of claim 19 where said internal feature is a hole.

21. The machine-readable medium of claim 16 where said step of determining a circle that is tangent to or contains each of said departure circles comprises
   providing a plurality of external manufactured features; and
   determining a circle that contains or intersects each of said departure circles.

22. The machine-readable medium of claim 21 where said external feature is a pin.

23. The machine-readable medium of claim 16 where said plurality of manufactured features are simulated manufactured features.

24. A machine-readable medium for programming a computer to determine whether a pattern of features violates a pattern locating tolerance for a plurality of manufactured features on an object, said medium comprising processor executable instructions for
   determining a true position for each of said plurality of manufactured features;
   determining a center for each of said plurality of manufactured features;
   organizing each of said true positions into a one true position;
   organizing the center of each of said plurality of manufactured features relative to said one true position;
   determining a departure circle about each of said centers; and
   determining where said departure circles lie relative to a pattern locating tolerance circle.

25. The machine-readable medium of claim 24 where said step of determining a departure circle about each of said centers comprises determining a difference in diameter from the minimum hole diameter allowable for a feature in a pattern.

26. The machine-readable medium of claim 24 where said step of determining if said departure circles lie outside a pattern locating tolerance circle comprises
   determining a pattern locating tolerance circle;
   centering said pattern locating tolerance circle about said one true position; and
   determining whether any portions of said departure circle lie outside of said pattern locating tolerance circle.

27. The machine-readable medium of claim 24 where said step of determining if said departure circles lie outside a pattern locating tolerance circle comprises
   determining a pattern locating tolerance circle for a plurality of simulated manufactured features;
   centering said pattern locating tolerance circle about said one true position; and
   determining whether all of said departure circle lies outside of the pattern locating tolerance circle.

28. The machine-readable medium of claim 24 where said plurality of manufactured features are simulated manufactured features.

29. A system in a manufacturing site, said system comprising a computer and a coordinate measuring machine adapted to determine whether a pattern of manufactured features violate a pattern locating tolerance, and adapted to determine feature relating tolerance consumed for said pattern of features, said system adapted to perform the steps of
   determining a true position for each of said plurality of manufactured features;
   determining a center for each of said plurality of manufactured features;
   organizing each of said true positions into a one true position;
   organizing the center of each of said plurality of manufactured features relative to said one true position;
   determining a departure circle about each of said centers;
   determining if any of said departure circles lies outside a pattern locating tolerance circle to determine if said pattern locating tolerance is violated;
   determining a circle that contains each of said departure circles; and
   comparing a diameter of said circle to said feature relating tolerance to determine acceptability of the pattern.

30. The system of claim 29 where said feature comprises an internal feature.

31. The system of claim 29 where said feature comprises an external feature.

32. The system of claim 31 where said step of determining a circle that contains each of said departure circles comprises a circle that is tangent on the far side of each departure circle.

33. The system of claim 29 where said feature relating tolerance is represented as a circle.

34. The machine-readable medium of claim 28 where said manufactured features are simulated manufactured features.

35. A method for determining feature relating tolerance consumed for a plurality of manufactured features on an object comprising:
   determining a true position for each of said plurality of manufactured features;
   determining a location for each of said plurality of manufactured features;
   organizing each of said true positions into a single association;
   organizing the location of each of said plurality of manufactured features relative to said single association;
   determining a circle that intersects or contains each location;
   determining the diameter of said circle; and
   comparing the diameter of said circle with said feature relating tolerance to determine acceptability of the pattern.

36. The method of claim 35 where said manufactured feature comprises an external feature.

37. The method of claim 35 where said processor executable instruction of determining a true position for each of said plurality of manufactured features comprises:
   determining a designed center for each of a plurality of manufactured internal features.

38. The method of claim 35 where said processor executable instruction of determining a true position for each of said plurality of manufactured features comprises:
   determining a designed center for each of a plurality of manufactured external features.

39. The method of claim 35 where said processor executable instruction of organizing the location of each of said plurality of manufactured features relative to said single association comprises organizing the location of manufactured holes relative to a one true position.

40. The method of claim 35 where said plurality of manufactured features are simulated manufactured features.

41. A method to determine used tolerances for a plurality of manufactured features on an object comprising:
   determining a true position for each of said plurality of manufactured features;
   determining a center for each of said plurality of manufactured features;
   organizing each of said true positions into a one true position;
   organizing the center of each of said plurality of manufactured features relative to said one true position;
   determining a departure circle about each of said centers;
   determining a first circle that is tangent to each of said departure circles; and
   comparing said first circle to a magnitude of a feature relating tolerances.

42. The method of claim 41 where said step of determining a true position for each of said plurality of manufactured features comprises determining the designed center for said manufactured feature.

43. The method of claim 41 where said step of determining a first circle that is tangent to each of said departure circles comprises
   providing a plurality of internal manufactured features; and
   determining a circle that is tangent to a near side of each departure circle.

44. The method of claim 43 where said internal manufactured features are holes.

45. The method of claim 41 where said step of determining a circle that is tangent to each of said departure circles comprises
   providing a plurality of external manufactured features; and
   determining a circle that is tangent to a far side of each departure circle.

46. The method of claim 45 where said external feature is a pin.

47. The method of claim 41 where said plurality of manufactured features are simulated manufactured features.

* * * * *